Patented June 24, 1947

2,423,044

UNITED STATES PATENT OFFICE 2,423,044

ARYL POLYMERCURY NAPHTHENATES AND THEIR PRODUCTION

Milton Nowak, Brooklyn, N. Y., assignor to Nuodex Products Co., Inc., Elizabeth, N. J., a corporation of New York No Drawing. Application March 23, 1945, Serial No. 584,492

4 Claims. (Cl. 260—434)

This invention relates to mercury toxicants adapted for general uses, but intended more especially for use as insecticides, fungicides, mildewproofing agents, rotproofing agents, disinfectants, germicides, anti-fouling ingredients of marine paints, and similar lines. In short they might be classified as agents directed toward the control or prevention or destruction of micro- and macroorganisms of plant and animal origin and of an inimicable nature to mankind.

Due to the ravages of such pests as termites, grasshoppers in the insect world, and due to the prevalence of other destructive organisms, such as fungi which are responsible for the mildewing of fabrics, cordage, the rotting of wood, etc., tremendous damage is sustained each year.

It is the purpose of this invention to provide new compounds which will be highly efficient in combating the various destructive organisms referred to, and others, and which are economical and practical to use.

Speaking generally, the compounds to which this invention relates represent organo-mercury compounds of the general formula $$R(Hg)_m(X)_n.R$$

in this formula represents an aryl group, the mercury (Hg) being attached with one valence directly to a carbon atom of said aryl group. The other valence of the mercury is attached to X. The symbol $m$ indicates the entire number of mercury atoms which may be attached to the aryl group within the range of 2 to 5, both inclusive. X is a substantially water-insoluble organic carboxylic acid. The symbol $n$ indicates the number of mols of acid required to neutralize the free valence of the mercury atoms, this number being within the range of 1 to 5, both inclusive.

The aryl group in the above formulation may, in practice, comprise either benzol, toluol, phenol, orthochlorphenol, aniline, para-nitro-aniline, benzoic acid, resorcinol, thiophenol, naphthalene, beta-naphthol, acetanilide and diphenyl. It may also include different combinations of the aromatic groups.

The carboxylic acids which may be utilized are naphthenic acid, oleic acid, 2-ethyl hexoic acid, capric acid, mono-octyl ester of phthalic acid, tall oil, abietic acid, paratertiary amyl phenoxy acetic acid, para-sec-amylbenzoyl-o-benzoic acid, alkenyl succinic acids, or combinations thereof, such as naphthenic acid and capric acid; 2-ethyl hexoic acid and oleic acid; tall oil and abietic acid; naphthenic acid, mono-octyl ester of phthalic acid and abietic acid, or combinations thereof.

The following are illustrative examples showing the preparation of the products of this invention according to the process of this invention.

Example 1

Cresol dimercury naphthenate, a compound of the general formula , where R is cresol, $m$ and $n$ are each 2, and X is naphthenic acid.

Cresol, 108 grams, is introduced into a 2 liter three-neck flask fitted with agitator, reflux condenser and thermometer, and is heated in an oil bath to 250° F. While agitating rapidly, 640 grams of mercuric acetate are added in small portions. The mercuric acetate reacts completely with the cresol to form a clear amber viscous liquid. The reflux condenser is then replaced by an ordinary distillation condenser and receiver, and acetic acid is distilled from the mixture in vacuo. 120 grams of acetic acid are obtained. The residue in the flask is a dark amber viscous liquid which solidifies on cooling to a brittle, clear solid, and consists of cresol dimercury acetate containing 63.7% mercury. The cresol dimercury acetate, a total of 628 grams, is mixed with 480 grams of naphthenic acid (acid number 235) and heated in an oil bath to 260°–270° F. under vacuo. 120 grams of acetic acid are collected in the receiver. The residue in the flask consists of cresol dimercury naphthenate, a dark amber liquid which cools to form a clear dark amber plastic solid containing 40.5% mercury. This material is soluble in xylol, toluol, mineral spirits, benzol, etc.

The end product made according to this example represents a highly efficient toxicant. If a dilution of this compound is applied upon cotton fabric so as to deposit as little as .1% of the compound per weight of the fabric (equivalent to only .04% mercury per weight of the fabric), the treated fabric will exhibit complete resistance to the growth of such highly active cellulose destructive fungi as *Chaetomium globosum*. Likewise, when the compound is applied upon fabric in combination with other fungicides, for example, copper naphthenate, it will greatly enhance the fungicidal protection of the treated fabric.

Example 2

Cresol dimercury oleate, a compound of the general formula $R(Hg)_m(X)_n$, wherein R is cresol, $m$ and $n$ each are 2, and X is oleic acid.

The cresol dimercury acetate, 628 grams, prepared as in Example 1 is added, while it is hot and in liquid form, to a rapidly agitated soap solution made up by mixing, at 160° F., the following materials in the order named:

| | | |
|---|---|---|
| Water | cc | 3,000 |
| NaOH | grams | 80 |
| Oleic acid (acid number 195) | do | 574 |
| Xylol | do | 800 |

The cresol dimercuric acetate reacts with the sodium oleate to form cresol dimercuric oleate (which dissolves in the xylol), and sodium acetate, which dissolves in the aqueous phase. After mixing for one-half hour, agitation is stopped and the xylol and aqueous phases allowed to separate. The xylol contains cresol dimercuric oleate and is found as the lower layer. The aqueous layer contains sodium acetate and a trace of mercury. The aqueous layer is siphoned off. The xylol layer may be further purified by mixing again at 160°–170° F. with 2,000 cc. water, draining off the water and finally drying the solvent layer by distilling off traces of water in vacuo. The cresol dimercury oleate may be left in the xylol solution, or may be isolated by distilling off all the xylol under high vacuum.

The end product of this example represents a highly efficient toxicant. It can be used in the treatment of many types of cellulosic materials, such as wood, textiles, paper, etc.

Example 3

Cresol trimercury naphthenate, a compound of the formula $R(Hg)_m(X)_n$, where R is cresol, $m$ and $n$ each equal 3, and X is naphthenic acid.

108 grams of cresol are placed in a 2 liter flask fitted with agitator, reflux condenser, and thermometer, and heated to 250°–260° F. While rapidly agitating 960 grams of mercuric acetate are added in small portions, and is completely reacted to form cresol trimercury acetate. The completion of the reaction is indicated by testing 0.5 cc. of the reaction mixture for the presence of mercuric acetate with potassium mercuric iodide solution. A negative test is obtained, indicating the absence of any mercuric acetate in the reaction mixture, and therefore, too, the completeness of the reaction.

If it is desired to isolate the cresol trimercuric acetate, the excess acetic acid may be distilled off in vacuum at 250° F., a total of 180 grams being collected. The residue, a clear amber liquid, consists of cresol trimercury acetate (67.5% mercury), which cools to a clear brittle solid. It is not necessary, however, to isolate the acetate if it is desired to make the naphthenate.

The reaction mixture of cresol trimercury acetate, consisting of 888 grams of the trimercury acetate and 180 grams of excess acetic acid are added slowly, while hot, to a soap solution made up at 160° F. of the following materials, mixed in the order indicated:

| | | |
|---|---|---|
| Water | cc | 5,000 |
| NaOH | grams | 200 |
| Naphthenic acid (acid number 235) | do | 720 |
| Xylol | do | 900 |

Agitation is continued for one-half hour, and the aqueous phase allowed to separate from the xylol solution, which contains cresol trimercuric naphthenate. The xylol solution is separated from the aqueous layer and washed by agitating again for ten minutes with 2,000 cc. of hot water, draining off the water and then removing all traces of moisture by heating in vacuo at 200° F. The cresol trimercury naphthenate may be allowed to remain in xylol solution, or may be isolated by distilling off all the solvent in vacuo.

The end product of this example represents a toxicant of unusually high efficiency. When the compound is applied to fabric so as to deposit thereon as little as .01% mercury (or approximately .2% of the compound itself), the treated fabric will have acquired immunity against such destructive fungi as Metarrhizium, *Chaetomium globosum*, etc.

Another extremely important application for this toxicant is the mildewproofing of paints. For this purpose, it has been found that as little as .25% of the compound per weight of paint will render such paint resistant to the attacks of surface mold such as *Aspergillus niger*, Penicillium, etc.

Still another useful application for this compound is in anti-fouling marine paints where preliminary results already on hand are most encouraging.

The compound is also effective against fungi on plants, such as *Altanaria solaris*, etc.

The compound is also effective against insects and other parasites.

Example 4

Cresol trimercury 2-ethyl hexoate, a compound of the general formula $R(Hg)_m(X)_n$, wherein R is cresol, $m$ and $n$ each equal 3 and X is 2-ethyl hexoic acid.

This is made in the same manner as cresol trimercury naphthenate, by using 435 grams of 2-ethyl hexoic acid in place of 720 grams of naphthenic acid, as described in Example 3.

The end product of this example represents a very excellent toxicant. This compound may be readily diluted upon the addition of organic solvents; for example, xylol, toluol, etc. It can also be applied in the form of an aqueous emulsion.

The compound is highly satisfactory as a mildew-proofing agent for cellulosic materials. It is also very effective against termites and can protect wood from the most concentrated attacks by termites. The compound is also a highly potent bactericide and germicide.

Example 5

Phenol dimercury octyl phthalate is a compound of the general formula $R(Hg)_m(X)_n$, where R is phenol, $m$ and $n$ each equal 2, and X is the mono-octyl ester of phthalic acid.

It is prepared in the same manner as cresol dimercury naphthenate in Example 1, using 94 grams of phenol in place of cresol, and 555 grams of mono-octyl phthalate in place of the naphthenic acid.

The compound made according to this example represents a very efficient toxicant. It is of splendid performance for such applications as mildewproofing of cellulosic materials, as a constituent of nitrocellulose lacquers and other protective coatings to render them resistant to such pathogenes as *Aspergillus niger*. It is also highly effective as a bactericide and germicide, as a constituent of soaps, etc.

Example 6

Ortho-chlorphenol dimercury alkenyl succinate, is a compound of the general formula $R(Hg)_m(X)_n$, where R is ortho-chlorphenol, $m$ equals 2 and $n$ is 1. X is an alkenyl succinic acid of the formula

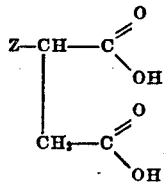

where Z is

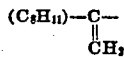

It is prepared as follows:

128.5 grams of ortho-chlorphenol are heated in a flask in an oil bath to 250° F., and 640 grams of mercuric acetate added while rapidly agitating the reaction mixture. When the reaction is complete, as evidenced by a negative mercuric ion test with potassium mercuric iodide solution, 250 grams of the alkenyl succinic acid are added, and the acetic acid distilled off in vacuo. The product is a translucent, hard solid mass.

The compound made according to this example represents a very satisfactory toxicant. It can be employed as a fungicide to protect leather and many other articles of commerce from attacks of proteolytic micro-organisms. It also acts as the toxicant constituent of marine antifouling paints.

Example 7

4-nitro-aniline dimercury naphthenate-caprate, is a compound of the formula $R(Hg)_m(X)_n$, where R is p-nitro-aniline, $m$ and $n$ are each 2, and X consists of equal mols of naphthenic acid and capric acid. This compound is made by the following procedure:

A solution of 138 grams of p-nitro-aniline in 1500 cc. of ethanol is refluxed after mixing with a solution of 640 grams of mercuric acetate in 2,000 cc. of water. A precipitate is obtained and filtered off. The precipitate is washed with hot alcohol containing a small amount of acetic acid, in order to remove any mono-substituted compound.

6.54 grams of the dried product is finely powdered and sprinkled slowly into a hot rapidly agitated solution of 2.5 grams of naphthenic acid and 1.72 grams of capric acid in 100 cc. of water containing 0.8 gram of sodium hydroxide, and 15 grams of xylol. p-Nitro-aniline dimercury naphthenate caprate is formed and dissolves in the xylol. Agitation is stopped and the xylol solution separated from the aqueous layer. The solid compound p-nitro-aniline-dimercuric naphthenate-caprate may be obtained by allowing the xylol to evaporate.

The compound made according to this example is a highly efficient toxicant for diverse applications. It may be used as a mildewproofing constituent for surface coatings to protect them from the discoloring and disfiguring effects of such molds as Penicillium. It is also very effective in the rot-proofing and termite-proofing of wood.

Example 8

Phenol pentamercury naphthenate is a compound of the general formula $R(Hg)_m(X)_n$, where R is a phenol group, $m$ and $n$ each equal 5, and X is naphthenic acid. It is prepared by adding 320 grams of mercuric acetate to 18 grams of phenol, while rapidly agitating and maintaining the temperature of the reaction mixture at 130° C. After all the mercuric acetate has been added, continue heating for one-half hour, and then add 250 grams of naphthenic acid (acid number 240). Acetic acid is distilled from the mixture in vacuo. The residue in the flask consists of a dark clear red amber liquid, which becomes a plastic solid on cooling, and consists of phenol pentamercury naphthenate.

The compound made according to this example is a very excellent toxicant for such applications as fungicidal protection of fabric, electrical equipment, wood, etc. It can also be employed as an agricultural toxicant against fungi, and also effective as a constituent of anti-fouling marine paints. It is also very efficient in preventing surface mold growth on paints, varnishes and the like.

Example 9

An emulsion base capable of yielding a stable dispersion of cresol trimercury naphthenate in water may be prepared by dissolving 50 grams of solid cresol trimercury naphthenate (as prepared in Example 3) in 105 grams of Cellosolve and adding to the solution 10 grams of "Emulphor" ELA, an emulsifying agent which is commercially available. The solution thus made disperses readily in water to yield a stable dispersion of cresol trimercury naphthenate of any desired concentration.

The composition made according to this example may be readily diluted with water to the desired concentration. The toxicant compound contained in this composition is just as effective as though it were used in the form of its organic solvent dilutions which has been described in Example 3.

The utility of this composition is particularly for those applications where an aqueous system has to be employed. For example, this composition may be employed in conjunction with water repellent emulsions which are used so generally today in the treatment of textiles. In such an application the use of very small quantities of the composition (as little as is equivalent to deposit .02% mercury on the fabric) is sufficient to prevent mildewing of the fabric.

The composition is also useful as a toxicant to prevent decomposition of starch pastes and other adhesives. It is also effective in preventing the formation of slime often encountered in such industrial processes as paper manufacture.

The foregoing examples explain the performance of the mercury compounds of this invention. The behavior of the compounds in the standard test procedures employed for their evaluation has been very remarkable and outstanding.

The foregoing detailed description sets forth the invention in its preferred practical forms, but said invention is to be understood as fully commensurate with the appended claims.

Having thus fully described the invention, what I claim as new and desire to secure by Letters Patent is:

1. A new compound having the formula $R(Hg)_m(X)_n$: wherein X represents naphthenic acid, R represents an aryl group, one valence of each mercury (Hg) atom being attached directly to a carbon atom of the aryl group, the other valence of each mercury atom being linked to one mol of the naphthenic acid by replacement of the acidic hydrogen of the acid, $m$ represents the entire number of mercury atoms within the range 2 to 5, both inclusive, and $n$ represents an equal number of mols of naphthenic acid.

2. A new compound having the formula $R(Hg)_m(X)_n$: wherein X represents naphthenic acid, R represents cresol, one valence of each mercury (Hg) atom being attached directly to a nuclear carbon atom of the cresol, the other valence of each mercury atom being linked to one mol of the naphthenic acid by replacement of the acidic hydrogen of the acid, and the value of $m$ and $n$ each being 2.

3. A new compound having the formula $R(Hg)_m(X)_n$: wherein X represents naphthenic acid, R represents ortho-chlorphenol, one valence of each mercury (Hg) atom being attached directly to a carbon atom of the ortho-chlorphenol, the other valence of each mercury atom being linked to one mol of the naphethenic acid by replacement of the acidic hydrogen of the acid, and the value of $m$ and $n$ each being 2.

4. The herein described method which comprises: reacting mercuric acetate with cresol in the proportion of 2 mols of the mercuric acetate for each mol of the cresol at a temperature within the range of 70°–150° C. to bring about a homogeneous solution of the constituents, thereafter reacting the resulting mass at a temperature under 100° C. in the presence of a solvent which is substantially water-immiscible and capable of dissolving the resulting cresol-dimercury-naphthenate with an aqueous solution of an alkali salt of naphthenic acid, the aqueous solution containing one mol of alkali naphthenate salt for each mol of mercury, and separating the water immiscible solvent containing the cresol-dimercury-naphthenate in solution from the aqueous phase.

MILTON NOWAK.

REFERENCES CITED

The following references are of record in the file of this patent:

UNITED STATES PATENTS

| Number | Name | Date |
|---|---|---|
| 1,878,962 | Meidert | Sept. 20, 1932 |
| 2,205,994 | Toune | June 25, 1940 |
| 1,554,293 | Paiziss | Sept. 22, 1925 |
| 1,748,331 | Engelmann | Feb. 25, 1930 |
| 1,993,776 | Engelmann | Mar. 17, 1935 |
| 2,014,676 | Weed | Sept. 17, 1935 |
| 2,074,040 | Andersen | Mar. 16, 1937 |
| 2,177,049 | Andersen | Oct. 24, 1939 |

FOREIGN PATENTS

| Number | Country | Date |
|---|---|---|
| 535,074 | Germany | Oct. 5, 1931 |
| 237,735 | Great Britain | Aug. 6, 1925 |

OTHER REFERENCES

Henry et al., Jour. Chem. Soc. (London), 125 T (1924), pp. 1049–1050, 1054 (complete article pp. 1049–1060).